United States Patent
Desbois

(10) Patent No.: US 7,368,504 B2
(45) Date of Patent: May 6, 2008

(54) METHOD FOR THE PRODUCTION OF IMPACT POLYSTYRENE

(75) Inventor: Philippe Desbois, Maikammer (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/597,785

(22) PCT Filed: Feb. 16, 2005

(86) PCT No.: PCT/EP2005/001535

§ 371 (c)(1),
(2), (4) Date: Aug. 8, 2006

(87) PCT Pub. No.: WO2005/082959

PCT Pub. Date: Sep. 9, 2005

(65) Prior Publication Data

US 2007/0161763 A1    Jul. 12, 2007

(30) Foreign Application Priority Data

Feb. 18, 2004   (DE) ...................... 10 2004 008 199

(51) Int. Cl.
*C08F 279/02*   (2006.01)
*C08F 4/52*   (2006.01)

(52) U.S. Cl. ............................ 525/70; 525/71; 525/86; 525/89; 525/316; 526/124.2

(58) Field of Classification Search .................. 525/70, 525/71, 86, 89, 316; 526/124.2
See application file for complete search history.

(56) References Cited

U.S. PATENT DOCUMENTS

| 6,444,762 | B1 | 9/2002 | Fischer et al. |
| 6,593,430 | B1 * | 7/2003 | Knoll et al. ................. 525/314 |
| 6,825,271 | B2 * | 11/2004 | Desbois et al. ............... 525/70 |
| 2003/0139531 | A1 | 7/2003 | Desbois et al. |
| 2006/0058177 | A1 * | 3/2006 | Desbois et al. ............. 502/103 |

FOREIGN PATENT DOCUMENTS

| DE | 100 22 504 | 11/2001 |
| DE | 102 18 161 | 11/2003 |
| DE | 10250280 | 5/2004 |
| DE | 10316266 | 10/2004 |

* cited by examiner

*Primary Examiner*—Randy Gulakowski
*Assistant Examiner*—Olga Asinovsky
(74) *Attorney, Agent, or Firm*—Connolly Bove Lodge and Hutz

(57) ABSTRACT

Process for preparation of impact-resistant polystyrene from diene monomers and from styrene monomers via anionic polymerization, where
1) in a stage 1) a rubber solution is prepared from the diene monomers, or from the diene monomers and from the styrene monomers, using an alkali metal organyl compound as initiator and with concomitant use of a solvent, and then
2) in a stage 2), styrene monomer is added to the rubber solution, and the resultant mixture is polymerized anionically to give the impact-resistant polystyrene, and where, after stage 1) and prior to stage 2), an organylaluminum compound and an alkali metal hydride are added to the rubber solution.

20 Claims, No Drawings

METHOD FOR THE PRODUCTION OF IMPACT POLYSTYRENE

CROSS REFERENCE TO RELATED APPLICATIONS

This application is a National Stage entry under 35 U.S.C. § 371 of PCT/EP2005/001535 filed on Feb. 16, 2005. International application PCT/EP2005/001535 claims priority to German application 102004008199.9 filed on Feb. 18, 2004, the entire contents of each of the above applications are incorporated by reference herein.

The invention relates to a process for preparation of impact-resistant polystyrene from diene monomers and from styrene monomers via anionic polymerization, where 1) in a stage 1) a rubber solution is prepared from the diene monomers, or from the diene monomers and from the styrene monomers, using an alkali metal organyl compound as initiator and with concomitant use of a solvent, and then
2) in a stage 2), styrene monomer is added to the rubber solution, and the resultant mixture is polymerized anionically to give the impact-resistant polystyrene, and where, after stage 1) and prior to stage 2), an organylaluminum compound and an alkali metal hydride are added to the rubber solution.

The invention further relates to the impact-resistant polystyrene obtainable by the process mentioned, to the use of the impact-resistant polystyrene for production of moldings, of foils, of fibers, or of foams, and also to the moldings, foils, fibers, and foams composed of the impact-resistant polystyrene.

Impact-resistant polystyrene (HIPS, High-impact Polystyrene) comprises by way of example polybutadiene rubber or styrene-butadiene block rubber, dispersed in a hard polystyrene matrix, and can be prepared via various polymerization processes, for example via free-radical or anionic polymerization. WO 98/07765 and WO 98/07766 describe by way of example the anionic polymerization of styrene and/or butadiene.

The polymers obtained via anionic polymerization have some advantages over the products obtained by a free-radical route, inter alia lower residual monomer contents and lower oligomer contents. Free-radical polymerization and anionic polymerization are fundamentally different. In the case of free-radical polymerization, the reaction proceeds by way of free radicals, and peroxidic initiators, for example, are used, but in contrast anionic polymerization proceeds by way of "living" carbon ions, and by way of example alkali metal organyl compounds are used as initiators. Anionic polymerization is preferably terminated by a chain terminator, e.g. a protic substance, such as water or alcohols, once the monomers have been consumed.

Anionic polymerization proceeds substantially more rapidly than free-radical polymerization and leads to higher conversions. The high reaction rate makes it difficult to control the temperature of the exothermic reaction. This can be countered via use of what are known as retarders (for example organylaluminum, organylzinc, or organylmagnesium compounds), which lower the reaction rate. The viscosity of the reaction mixture generally increases rapidly during the anionic rubber preparation process, and the result can be that undesired "hot spots" form in the reactor, and that the reaction mixture is difficult to handle. The polymerization reaction is therefore generally carried out in an inert solvent, e.g. hydrocarbons, such as toluene or cyclohexane, with resultant restriction on viscosity rise.

The rubber solution obtained, mostly prepared batchwise, is then usually placed into intermediate storage in a buffer tank and finally transferred into a second, e.g. continuously operated, reactor, where it is admixed with styrene monomer and the mixture is polymerized to give the HIPS, and reference can be made here by way of example to the earlier DE patent applications found under 10250280.3 and 10316266.6, not published before the priority date of the present application, and also to the examples on page 11, line 28 to page 12, line 6 of DE-A 102 18 161.

Despite the use of inert solvents, the viscosity of the rubber solution is very high, and this can increase the difficulty of transfer of the solution into the second reactor, e.g. via pumping. Although it is possible to increase the amount of solvent markedly during rubber preparation and thus obtain a low-viscosity rubber solution, additional solvent reduces the cost-effectiveness of the process, since it eventually has to be removed subsequently from the HIPS end product.

It was an object to eliminate the disadvantages described. In particular, an object was to provide an alternative process which can prepare impact-resistant polystyrene and which is more cost-effective. In particular, the handling of the rubber solution should be easier during the process. Furthermore, the viscosity of the rubber solution should be lower, and pump-conveying of this solution should be easier.

These improvements should not be achieved via an increase in the amount of solvent—which is disadvantageous, because it is not cost-effective.

Accordingly, the process defined at the outset has been found, as has the impact-resistant polystyrene mentioned, its use, and the moldings, foils, fibers, and foams. Preferred embodiments of the invention are given in the subclaims.

In a stage 1) of the inventive process, a rubber solution is prepared from the diene monomers, or from the diene monomers and from the styrene monomers, using an alkali metal organyl compound as initiator and with concomitant use of a solvent.

Diene monomers that can be used are any of the polymerizable dienes, in particular 1,3-butadiene (abbreviated to: butadiene), 1,3-pentadiene, 1,3-hexadiene, 2,3-dimethylbutadiene, isoprene, piperylene, or a mixture of these. Butadiene is preferred.

Suitable styrene monomers are any of the vinylaromatic monomers, such as styrene, α-methylstyrene, p-methylstyrene, ethylstyrene, tert-butylstyrene, vinylstyrene, vinyltoluene, 1,2-diphenylethylene, 1,1-diphenylethylene, or a mixture of these. Styrene is particularly preferably used.

In one preferred embodiment, styrene is used as styrene monomer and butadiene is used as diene monomer. It is also possible to use mixtures of these monomers.

Other comonomers can also be used concomitantly, for example using a proportion of from 0 to 50% by weight, preferably from 0 to 30% by weight, and particularly preferably from 0 to 15% by weight, based on the total amount of the monomers used in stage 1). Examples of those suitable are acrylates, in particular $C_{1-12}$-alkylacrylates, such as n- or tert-butyl acrylate or 2-ethylhexyl acrylate, and the corresponding methacrylates, such as methyl methacrylate (MMA). Epoxides are also suitable, e.g. ethylene oxide or propylene oxide. Lines 5-50 on page 3 of DE-A 196 33 626 give other suitable comonomers under M1-M10.

Organyl compounds hereinafter are the organometallic compounds of the elements mentioned having at least one metal-carbon σ-bond, in particular the alkyl or aryl compounds. The organylmetal compounds can also comprise hydrogen or halogen, or can comprise organic radicals bonded by way of heteroatoms, examples being alcoholate radicals or phenolate radicals, on the metal. By way of example, the latter are obtainable via complete or partial hydrolysis, alcoholysis, or aminolysis.

Particular alkali metal organyl compounds (initiators) that can be used are mono-, bi-, or polyfunctional alkali metal alkyl, aryl, or aralkyl compounds (but not alkali metal hydrides, such as lithium hydride, sodium hydride, or potassium hydride). An organyllithium compound, i.e. an organolithium compound, is preferably used as alkali metal organyl compound. Examples of those suitable are ethyl-, propyl-, isopropyl-, n-butyl-, sec-butyl-, tert-butyl-, phenyl-, diphenylhexyl-, hexamethylenedi-, butadienyl-, isoprenyl-, or polystyryllithium, or the polyfunctional compounds 1,4-dilithiobutane, 1,4-dilithio-2-butene, or 1,4-dilithiobenzene. sec-Butyllithium is preferably used.

It is believed that an oligomeric polystyrene-alkali metal compound forms from polystyryl anion and alkali metal cation, and that the polymerization reaction proceeds at the polystyryl anion. Accordingly, styrene and organyllithium compound probably form the compound [Polystyryl]$^\ominus$Li$^\oplus$. During the polymerization reaction, and also after it has ended, i.e. also after the monomers have been consumed, there are "living" polymer chains in the reaction mixture. "Living" means that the polymerization reaction would immediately start again on addition of further monomer, without any need to add further polymerization initiator.

The amount needed of alkali metal organyl compound depends, inter alia, on the desired molecular weight (molar mass) of the polymer to be prepared, on the nature and amount of the organylaluminum compound used (see below), and on the polymerization temperature. The amount used is generally from 0.0001 to 10 mol %, preferably from 0.001 to 1 mol %, and particular preferably from 0.01 to 0.2 mol % of alkali metal organyl compound, based on the total amount of the monomers used in stage 1). It is also possible to use two or more alkali metal organyl compounds.

The polymerization reaction is carried out in the presence of a solvent. Examples of suitable solvents are aliphatic, isocyclic, or aromatic hydrocarbons or hydrocarbon mixtures, e.g. benzene, toluene, ethylbenzene, xylene, cumene, hexane, heptane, octane, or cyclohexane. It is preferable to use solvents whose boiling point is above 75° C., examples being ethylbenzene, toluene, or cyclohexane. Ethylbenzene is particularly preferred. The solvent is removed at a later stage during the devolatilization process and can be collected, purified, and reused.

In the preparation of the rubber in stage 1) and/or in the preparation of the hard matrix in stage 2), it is also possible to use polar compounds or Lewis bases. In principle, any of the anionic-polymerization additives known from the literature is suitable. They generally comprise at least one O, N—, S—, or P atom having a free electron pair. Ethers and amines are preferred, examples being tetrahydrofuran (THF), diethyl ether, tetrahydropyran, dioxane, crown ethers, alkylene glycol dialkyl ethers, e.g. ethylene glycol monoethyl ether, ethylene glycol dimethyl ether, N,N,N',N'-tetramethyl-ethylenediamine, N,N,N',N'',N''-pentamethylenetriamine, 1,2-bis(piperidino)ethane, pyridine, N,N,N',N',N'', N''-hexamethyltriethylenetriamine, and hexamethylphosphoramide. THF is preferred.

The Lewis bases act as an activator and in many cases increase conversion in the polymerization reactions or raise the reaction rate. To the extent that they are added prior to or during the rubber polymerization reaction, they are moreover capable of controlling the proportions of the different vinyl linkages in the butadiene polymers or isoprene polymers, and thus influencing the microstructure of the rubber. In particular, in the case of styrene-butadiene block copolymers, and in the case of polybutadiene and of polyisoprene, it is possible to control the content of 1,2-vinyl linkages in the polybutadiene or polyisoprene. Because the mechanical properties of these rubbers are also determined by the 1,2-vinyl content of the polybutadiene or of the polyisoprene, the process therefore permits preparation of HIPS.

If the Lewis bases increase the reaction rate, their amount is advantageously to be judged in such a way that the reaction rate of the entire mixture is lower than that of a mixture used without addition of the retardant components. The amount used for this purpose is less than 500 mol %, preferably less than 200 mol %, and in particular less than 100 mol %, of the Lewis base, based on the alkali metal organyl compound.

The Lewis bases can be added prior to or after the rubber synthesis reaction, and this depends on whether the Lewis bases are used for control of rubber microstructure or for accelerating the reaction.

It can be advantageous, prior to stage 2), to dilute the resultant rubber solution with styrene monomer. The above-mentioned styrene monomers are suitable for this purpose, in particular styrene. By way of example, dilution with styrene in stage 1) can give precise adjustment of the solids content of the solution.

The manner of selection of the other polymerization conditions, such as temperature, pressure, and polymerization time, is usually similar to that for anionic polymerization processes known to the person skilled in the art for styrene monomers and for diene monomers.

Because the polymerization reaction has a living character, it immediately starts again on addition of further monomer, without further addition of initiator. Accordingly, stage 1) is not usually terminated via addition of a chain terminator, such as water or alcohol, after the polymerization reaction. However, the reaction can be "frozen" via addition of a molar excess, based on the initiator, of organylaluminum compound.

Stage 1) of the inventive process can be carried out batchwise or continuously, in any reactor that resists pressure and heat, and in principle it is possible to use back-mixing or non-back-mixing reactors (e.g. reactors with stirred-tank behavior or with tubular-reactor behavior). The process leads to polymers with high or low molecular weight, as a function of selection of the initiator concentration and initiator constitution, of the specific process sequence used, and of other parameters, such as temperature and optionally temperature profile. By way of example, stirred tanks, tower reactors, loop reactors, and also tubular reactors or tube-bundle reactors, with or without internals, are suitable. Internals can be static or movable internals. The polymerization reaction can be carried out in one or more stages. It is preferable that the polymerization reaction in stage 1) is carried out batchwise, for example in a stirred tank.

The specifications WO 98/07765 and WO 98/07766 give further details concerning the design of the reactors and the operating conditions, and these specifications are expressly incorporated herein by way of reference.

Stage 1) of the process gives a reaction mixture which comprises the rubber polymer dissolved in an inert solvent.

Such rubber polymers are homopolymers, such as polybutadiene (PB) and polyisoprene (PI), and also copolymers, such as styrene-butadiene block copolymers (S-B polymers). The rubber has preferably been selected from polybutadiene and styrene-butadiene block copolymers.

The styrene-butadiene block copolymers may, for example, be linear two-block S-B copolymers or three-block S-B-S or B-S-B copolymers or other polyblock copolymers (S=styrene block, B=butadiene block), as obtained via anionic polymerization by the inventive process. The block structure is produced substantially by the fact that styrene alone is first polymerized anionically, producing a styrene block. Once the styrene monomers have been consumed, the monomer is changed by adding monomeric butadiene, and the material is polymerized anionically to give a butadiene block polymer (this being known as sequential polymerization). The resultant two-block S-B polymer can be polymerized via a further change to styrene monomer to give a three-block S-B-S polymer, if desired. The same principle applies to three-block B-S-B copolymers.

In the case of the three-block copolymers, the two styrene blocks can be of identical size (identical molecular weight, i.e. symmetrical $S_1$-B-$S_1$ structure) or can be of different size (different molecular weight, i.e. asymmetrical $S_1$-B-$S_2$ structure). The same principle applies to the two butadiene blocks in the B-S-B block copolymers. Other block sequences are, of course, also possible, S-S-B or $S_1$-$S_2$-B, or S-B-B or S-$B_1$-$B_2$. The indices above represent the block sizes (block lengths or molecular weights). The block sizes depend, by way of example, on the amounts of monomers used and on the polymerization conditions.

There may also be B/S blocks instead of the elastomeric "soft" butadiene blocks B or in addition to the blocks B. They are likewise soft and comprise butadiene and styrene, for example having random distribution or a tapered structure (tapered=gradient from styrene-rich to styrene-poor or vice versa). If the block copolymer comprises two or more B/S blocks, the absolute amounts, and the relative proportions, of styrene and butadiene in the individual B/S blocks may be the same or different, giving different blocks $(B/S)_1$, $(B/S)_2$, etc.

The block copolymers mentioned may have a linear structure (described above), and the same is generally true of the homopolymers. However, branched or star structures are also possible and for some applications are preferred. Branched copolymers are obtained in a manner known per se, e.g. via graft reactions of polymeric "branches" onto a main polymer chain.

Star-block copolymers are formed, by way of example, via reaction of the living anionic chain ends with an at least bifunctional coupling agent. These coupling agents are described in U.S. Pat. Nos. 3,985,830, 3,280,084, 3,637,554, and 4,091,053, for example. Preference is given to epoxidized glycerides (e.g. epoxidized linseed oil or soybean oil), silicon halides, such as $SiCl_4$, or else divinylbenzene, and also polyfunctional aldehydes, ketones, esters, anhydrides, or epoxides. Specifically for dimerization, other suitable compounds are dichlorodialkylsilanes, dialdehydes, such as terephthalic aldehyde, and esters, such as ethyl formate. Symmetrical or asymmetrical star structures can be prepared via coupling of identical or different polymer chains, and this means that the individual branches of the star can be identical or different, and in particular can comprise different blocks S, B, B/S, or different block sequences. Further details concerning the start-block copolymers are found by way of example in WO-A 00/58380.

The monomer names used above, styrene and butadiene, also represent by way of example other vinylaromatic monomers and, respectively, diene monomers.

According to the invention, an organylaluminum compound and an alkali metal hydride are added to the resultant rubber solution after stage 1) and prior to stage 2).

Organylaluminum compounds that can be used are those of the formula $R_3Al$, where the radicals R, are independently of one another, hydrogen, halogen, $C_{1-20}$-alkyl, or $C_{6-20}$-aryl. Preferred organylaluminum compounds are the trialkylaluminum compounds, such as triethylaluminum (TEA), triisobutylaluminum (TIBA), tri-n-butylaluminum, triisopropylaluminum, tri-n-hexylaluminum, and dialkylaluminum hydrides, such as diethylaluminum hydride (DEAH), or diisobutylaluminum hydride (DIBAH). It is particularly preferable to use TEA or TIBA, particular preference being given to TEA. The organylaluminum compounds can also comprise those prepared via partial or complete hydrolysis, alcoholysis, aminolysis, or oxidation of alkyl- or arylaldminum compounds. Examples are diethylaluminum ethoxide, diisobutylaluminum ethoxide, diisobutyl(2,6-di-tert-butyl-4-methylphenoxy)aluminum (CAS No. 56252-56-3), methylaluminoxane, isobutylated methylaluminoxane, isobutylaluminoxane, tetraisobutyidialuminoxane, or bis(diisobutyl)aluminum oxide.

In addition to the organylaluminum compounds, it is possible to use organyl compounds of magnesium and/or of zinc. Suitable organylmagnesium compounds are those of the formula $R_2Mg$, where the radicals R are as defined above. Preference is given to use of dialkylmagnesium compounds, in particular the ethyl, propyl, butyl, hexyl, or octyl compounds which are commercially available products. It is particularly preferable to use (n-butyl)(sec-butyl)magnesium, which is soluble in hydrocarbons. Organylzinc compounds which can be used are those of the formula $R_2Zn$, where the radicals R are as defined above. Preferred organylzinc compounds are dialkylzinc compounds, in particular having ethyl, propyl, butyl, hexyl, or octyl as alkyl radical. Diethylzinc is particularly preferred. If organylmagnesium and/or organylzinc compounds are used concomitantly, the term organylaluminum hereinafter means organylaluminum, organylmagnesium, and organylzinc compounds.

Examples of suitable alkali metal hydrides are lithium hydride, sodium hydride or potassium hydride, preferably sodium hydride.

The amount of organylaluminum compounds needed depends inter alia on the nature and amount of the alkali metal organyl compound used, and on the viscosity of the rubber solution. The amount usually used is from 0.0001 to 10 mol %, preferably from 0.001 to 5 mol %, and in particular from 0.01 to 2 mol %, of organylaluminum compound, based on the total amount of the monomers used in stage 1). It is, of course, also possible to use two or more organylaluminum, organylmagnesium, and, respectively, organylzinc compounds.

The amount of alkali metal hydride needed depends inter alia on the nature and amount of the organylaluminum compound used, and on the viscosity of the rubber solution. The amount usually used is from 0.0001 to 10 mol %, preferably from 0.001 to 5 mol %, and in particular from 0.01 to 2 mol %, of alkali metal hydride, based on the total amount of the monomers used in stage 1). It is, of course, also possible to use two or more alkali metal hydrides.

Addition of the organylaluminum compounds and alkali metal hydrides is delayed until after polymerization of the diene monomers or of the diene monomers and styrene monomers, this means that they are added to the solution of the finished rubber. Accordingly, the aluminum compounds do not act, as in processes of the prior art, as retarders (additives which reduce polymerization rate and thus control the polymerization of the rubber monomers). It has surprisingly been found that addition of the organylaluminum compounds after the polymerization reaction markedly reduces the viscosity of the rubber solution. It is possible that the organylaluminum compound at least to some extent breaks the dimeric lithium complexes present in the rubber solution after the polymerization reaction, thus lowering the viscosity.

It is also believed that the organylaluminum compounds stabilize the living polymer chains. In particular, the organylaluminum compounds appear to inhibit thermal degradation of the living chains during transfer of the rubber into the second reactor, which is preferably undertaken at an elevated temperature, see a later stage below.

The organylaluminum compound and alkali metal hydride can be added separately from one another or preferably together. The organylaluminum compound and the alkali metal hydride—and likewise the alkali metal organyl initiator—can be used undiluted or preferably diluted or suspended in an inert solvent or suspension medium, e.g. ethylbenzene, cyclohexane, or toluene. Mineral oil is, for example, suitable as suspension medium for the alkali metal hydride.

If, as is preferred, stages 1) and 2) of the inventive process are carried out in different reactors, it is preferable to add organylaluminum compound and alkali metal hydride to the rubber solution while the material is still in the first reactor, particularly preferably prior to the transfer of the solution into the second reactor. If the solution is placed into intermediate storage in a buffer tank, it is preferable to add organylaluminum compound and alkali metal hydride prior to transfer into the buffer tank.

It is preferable to use organylaluminum compound and alkali metal hydride in advance to prepare a mixture which is then added to the rubber solution. This mixture particularly preferably also comprises styrene or other styrene monomers. This mixture is preferably prepared with concomitant use of a solution or suspension medium. Inert hydrocarbons are particularly suitable, more precisely aliphatic, cycloaliphatic, or aromatic hydrocarbons, e.g. cyclohexane, methylcyclohexane, pentane, hexane, heptane, isooctane, benzene, toluene, xylene, ethylbenzene, decalin, or paraffin oil, or a mixture of these. Ethylbenzene is particularly preferred.

To prepare the mixture, by way of example, solvent, styrene, and the alkali metal hydride can be used as initial charge, and then the organylaluminum compound can be added. It is advantageous to permit this mixture then to age for a certain time, for example from 2 min to 24 hours. The aging process is probably attributable to complexing of the metal compounds, which proceeds more slowly than the mixing procedure. The components can be mixed in any mixing assembly, preferably in those which can be supplied with inert gas. By way of example, stirred reactors with anchor stirrers, or vibrating vessels. Heatable tubes with static mixer elements are particularly suitable for the continuous preparation process. The aging process can also take place in a stirred tank through which material flows continuously, or in a tube section, the volume of which, together with the flow rate, determines the aging time.

The molar ratios of organylaluminum compound, alkali metal organyl compound (initiator), and alkali metal hydride present after stage 1) and before stage 2) can vary. The molar ratio of organylaluminum compound to alkali metal organyl compound in stage 1) is usually from 10 to 1000, preferably from 20 to 500, and in particular from 50 to 200, mol % of aluminum from the organylaluminum compound, based on the molar amount of alkali metal from the alkali metal organyl initiator.

The molar ratio of organylaluminum compound to alkali metal hydride after stage 1) and before stage 2 is usually from 10 to 200, preferably from 20 to 200, and in particular from 50 to 150, mol % of alkali metal from the alkali metal hydride, based on the molar amount of aluminum from the organylaluminum compound.

The molar ratio of organylaluminum compound to the entirety of all of the alkali metal compounds, i.e. alkali metal organyl compound and alkali metal hydride, after stage 1) and before stage 2), is generally from 5 to 500, preferably from 10 to 300, and in particular from 20 to 100, mol % of aluminum from the organylaluminum compound, based on the total molar amount of alkali metal (entirety of the alkali metal organyl initiator and the alkali metal hydride).

In stage 2) of the inventive process, styrene monomer is added to the resultant rubber solution, and the resultant mixture is polymerized anionically to give the impact-resistant polystyrene.

Suitable styrene monomers have been mentioned at an earlier stage above. It is preferable to use styrene or α-methylstyrene, particularly preferably styrene.

The styrene monomer added in stage 2)—and, if appropriate, the styrene monomer previously added in stage 1) for dilution of the rubber solution—is polymerized anionically in the presence of the rubber to give the HIPS.

The other comonomers mentioned above can be used concomitantly in stage 2), in addition to the styrene monomers. Their proportion is generally from 0 to 50% by weight, preferably from 0 to 30% by weight, and particularly preferably from 0 to 15% by weight, based on the total amount of the monomers used in stage 2).

The anionic polymerization reaction in stage 2) takes place in a manner known per se. The initiators used comprise the alkali metal organyl compounds, alkali metal hydrides, and mixtures of these mentioned above. Preferred alkali metal compounds have been mentioned above. Particularly preferred alkali metal organyl compound is sec-butyl-lithium, and particularly preferred alkali metal hydride is sodium hydride.

If the polymerization reaction in stage 1) has been terminated, alkali metal organyl compound or alkali metal hydride has to be used again for initiation in stage 2). If no termination has taken place in stage 1) (this being preferred) it is possible, as a function of desired molecular weight of the polymer, to add alkali metal organyl compound or alkali metal hydride again, but this is not essential. However, even without termination of the polymerization in stage 1), it is preferable to add alkali metal organyl compound or alkali metal hydride again in stage 2).

The amount of alkali metal hydride and, respectively, alkali metal organyl compound needed in stage 2) depends inter alia on the desired molecular weight (molar mass) of the polymer to be prepared, on the nature and amount of the organylaluminum compound used, and on the polymerization temperature. If an alkali metal hydride or alkali metal organyl compound is used, the amount used is usually from 0.0001 to 10 mol %, preferably from 0.001 to 1 mol %, and particularly preferably from 0.01 to 0.2 mol %, of alkali metal hydride and, respectively, alkali metal organyl compound, based on the total amount of the monomers used in stage 2). It is also possible to use two or more alkali metal hydrides and, respectively, alkali metal organyl compounds.

Concomitant use of an organylaluminum compound in stage 2) is preferred. Suitable and preferred organylaluminum compounds have been described above. Particularly preferred organylaluminum compounds are TIBA and TEA, in particular TEA.

It is also possible to use the abovementioned organylmagnesium compounds and/or organylzinc compounds, in addition to the organylaluminum compounds. If organylmagnesium compounds and/or organylzinc compounds are used concomitantly, the term organylaluminum compound hereinafter covers organylaluminum compounds, organylmagnesium compounds, and organylzinc compounds.

Unlike in stage 1), the organylaluminum compound in stage 2) is added prior to the polymerization reaction and acts as retarder, i.e. serves to control the reaction. The amount needed in stage 2) of organylaluminum compound depends, inter alia, on the nature and amount of the alkali metal organyl compounds and, respectively, alkali metal hydrides used in stage 1) and 2) of the process, and on the polymerization temperature. If organylaluminum compound is used, the amount thereof is usually from 0.0001 to 10, preferably from 0.001 to 5, and particularly from 0.01 to 2, mol % of organylaluminum compound, based on the total amount of the monomers used in stage 2). It is, of course, also possible to use two or more organylaluminum compounds.

The alkali metal organyl compounds, alkali metal hydrides, and, respectively, organylaluminum compounds used in stage 1) and stage 2) here can be identified with, or differ from, one another.

The molar ratios of organylaluminum compound, alkali metal organyl compound, and alkali metal hydride present in stage 2) of the inventive process can vary. The molar ratio of organylaluminum compound to alkali metal organyl compound in stage 2) is usually from 0.1:1 to 20:1, preferably from 0.2:1 to 10:1, calculated as molar $Al/M_{organyl}$ (M=alkali metal) ratio. The molar ratio of organylaluminum compound to alkali metal hydride in stage 2) is usually from 0.2:1 to 5:1, preferably from 0.5:1 to 1.5:1, calculated as molar $Al/M_{hydride}$ ratio.

The molar ratio of organylaluminum compound to the entirety of all of the alkali metal compounds, i.e. alkali metal organyl compound and alkali metal hydride, in stage 2) is generally from 0.1:1 to 5:1, in particular from 0.5:1 to 1.5:1, calculated as molar $Al/M_{organyl+hydride}$ ratio.

The sequence of addition of styrene monomer, organylaluminum compound, and also alkali metal hydride and/or alkali metal organyl compound in stage 2) is preferably selected in such a way that the styrene monomer is fed after, or together with, the organylaluminum compound and the alkali metal hydride and, respectively, alkali metal organyl compound, in order to prevent premature polymerization of the styrene monomers. If the components are added in succession, a possibility by way of example is first to add the organylaluminum compound, and then to add the alkali metal hydride and, respectively, alkali metal organyl compound, and finally to add the styrene monomer.

It is preferable that organylaluminum compound, and also alkali metal hydride and/or alkali metal organyl compound are added in the form of a mixture which is prepared in advance as described at an earlier stage above.

An inert solvent may again be added in stage 2). Suitable solvents are those mentioned above. However, it is preferable that no further solvent is added, in order that in the subsequent work-up no solvents have to be removed other than the solvent added in stage 1) during the rubber synthesis.

The usual polymerization temperature in stage 2) is from 50 to 250° C., preferably from 75 to 200° C., and particularly preferably from 80 to 180° C. With respect to pressure and polymerization time, the statements made concerning stage 1) are applicable.

Stage 2) of the process can be carried out batchwise or continuously in any of the reactors which were previously described for stage 1) and which resist pressure and heat. The polymerization in stage 2) is preferably carried out continuously, for example in a tower reactor or tubular reactor.

In one preferred embodiment, the polymerization is carried out in stage 1) batchwise and in stage 2) continuously. In both stages it is, of course, possible to use two or more reactors instead of a single reactor. By way of example, in stage 1) the rubber can be polymerized in a stirred-tank cascade, and/or in stage 2) the matrix can be polymerized in two or more tower or tubular reactors arranged in series.

Once the polymerization has been completed the polymerization reaction is terminated via addition of a chain terminator, which irreversibly terminates the living polymer chain ends. Chain terminators that can be used are any of the substances having active protons, and Lewis acids. Examples of suitable substances are water (preferably), and also $C_1$-$C_{10}$ alcohols, such as methanol, ethanol, isopropanol, n-propanol, and the butanols. Aliphatic and aromatic carboxylic acids, such as 2-ethylhexanoic acid, are also suitable, as are phenols. It is also possible to use inorganic acids, such as carbonic acid (a solution of $CO_2$ in water) and boric acid.

The chain terminator can either be used as its stands or else in the form of a chain terminator mixture comprising the chain terminator, mineral oil (in which connection see below) and, if appropriate, a conventional emulsifier. The surfactant properties of the emulsifier stabilize the mixture composed of the polar chain terminator and of the nonpolar polymer solution.

After termination of the reaction, the reaction mixture is generally worked up, for example by means of devolatilization. It comprises by way of example, besides the desired impact-resistant polystyrene, the auxiliaries and additives used during polymerization and termination, and also, if appropriate, unreacted monomers (known as residual monomers), and, if appropriate, oligomers or low-molecular-weight polymers, as undesired polymerization by-products. The devolatilization process, for example by means of conventional devolatilization apparatus, such as vented extruders, partial evaporators, extrudate devolatilizers, or evacuated vessels removes residual monomers and residual oligomers, and also in particular removes the solvent added in stage 1).

The product obtained from the process is impact-resistant polystyrene (HIPS), comprising a rubber component and a hard matrix. Examples of a suitable rubber component are:
  a) Polybutadiene and, respectively, polyisoprene whose weight-average molar mass Mw is preferably from 10 000 to 500 000, preferably from 30 000 to 300 000.
  b) S-B styrene-butadiene two-block copolymers whose styrene content is from 1 to 80% by weight, preferably from 5 to 50% by weight. The molar masses Mw for the styrene block S are preferably from 1000 to 200 000, in particular from 5000 to 100 000, and those for the butadiene block B are preferably from 20 000 to 300 000, in particular from 50 000 to 150 000.
  c) $S_1$-B-$S_2$ styrene-butadiene-styrene three-block copolymers whose styrene content is from 1 to 80% by weight, preferably from 5 to 50% by weight. The molar masses Mw for the first styrene block $S_1$ are preferably from 1000 to 150 000, in particular from 5000 to 100

000, and for the butadiene block B are preferably from 20 000 to 300 000, in particular from 50 000 to 150 000, and for the second styrene block $S_2$ are preferably from 1000 to 150 000, in particular from 5000 to 100 000. The data given are weight-average Mw in g/mol.
d) Mixtures of the block copolymers b) and c).
e) Mixtures of the polybutadiene a) with the block copolymers b) and/or c).

The weight-average molar mass Mw of the hard matrix is generally from 50 000 to 300 000 g/mol, preferably from 100 000 to 250 000 g/mol.

The invention provides not only the process described above but also the impact-resistant polystyrene (HIPS) obtainable by the polymerization process.

A very wide variety of additives and/or processing aids can be added to the inventive impact-resistant polystyrene in order to give it particular properties. In one preferred embodiment, amounts of, by way of example, from 0.1 to 10% by weight, preferably from 0.5 to 5% by weight, of a mineral oil, e.g. white oil, are added, thus improving mechanical properties, in particular increasing tensile strain at break.

In another preferred embodiment, amounts of, by way of example, from 0.01 to 0.3% by weight, preferably from 0.02 to 0.2% by weight, of antioxidant or a stabilizer to counteract exposure to light (abbreviated to: light stabilizer)., or of a mixture of these, is used as further additive. These additives increase the resistance of the polymer to air and oxygen and, respectively, to UV radiation, and thus increase weathering resistance and aging resistance of the polymer. The amounts stated are based on the polymer obtained.

The polymers can comprise other additives or processing aids in addition to the mineral oils, antioxidants, and light stabilizers, examples being lubricants or mold-release agents, colorants, e.g. pigments or dyes, flame retardants, fibrous and pulverulent fillers or fibrous and pulverulent reinforcing agents, or antistatic agents, and also other additives, or a mixture of these. The amounts used of the individual additives are those which are respectively conventional, and further details in this connection would therefore be superfluous. By way of example, the additives can be added during work-up of the polymer melt, and/or can be added to the solid polymer (e.g. polymer pellets) by mixing methods known per se, for example with melting in an extruder, Banbury mixer, kneader, or on a roll mill or calender.

The inventive impact-resistant polystyrenes can be used to produce moldings (including semifinished products), foils, fibers, and foams of any type.

The invention therefore also provides the use of the inventive impact-resistant polystyrene for production of moldings, of foils, of fibers, and of foams, and also provides the moldings, foils, fibers, and foams obtainable from the impact-resistant polystyrene.

The inventive process is more cost-effective than the processes of the prior art. In the inventive process, the rubber solution is easier to handle, in particular easier to circulate by pumping. The viscosity of the rubber solution is markedly lower, although the amount of solvent used is no more than in the processes of the prior art.

EXAMPLES

The following compounds were used, and "purified" here means use of aluminoxane for purification and drying. All of the reactions were carried out with exclusion of moisture.
Styrene, purified, from BASF
Butadiene, purified, from BASF
sec-Butyllithium (s-BuLi) in the form of 12% strength by weight solution in cyclohexane, ready-to-use solution from Chemetall
Sodium hydride, in the form of 60% strength by weight suspension in mineral oil, ready-to-use suspension from Chemetall
Triisobutylaluminum (TIBA) in the form of 20% strength by weight solution in toluene, ready-to-use solution from Crompton
Triethylaluminum (TEA) in the from of 20% strength by weight solution in ethylbenzene, ready-to-use solution from Crompton
Tetrahydrofuran (THF), from BASF
Toluene, purified from BASF
Ethylbenzene, purified, from BASF
Irganox® 1076=otadecyl 3-(3,5-di-tert-butyl-4-hydroxyphenyl)propionate (CAS 2082-79-3), from Ciba Specialty Chemicals
Winog® 70 mineral oil, a medicinal white oil from Wintershall
Water as chain terminator.

The specifications stated below under items 2 and 3 are general specifications. Tables 1 and 2 collate the individual values for variables y1 to y3, and also x1 to x30.

1. Preparation of Mixtures Composed of Organylaluminum Compound and Alkali Metal Organyl Compound or Alkali Metal Hydride Mixture A: TIBA/styrene/s-BuLi:
1980 g of toluene were used as initial charge in a 15 l stirred tank at 25° C., and y1 g of styrene and y2 g of the 12% strength by weight solution of s-BuLi in cyclohexane were added with stirring. 10 min after this, 913 g of the 20% strength by weight solution of TIBA in toluene were added to the mixture, and the solution was cooled to 50° C. The mixture was kept at this temperature for 3 hours, and then at 23° C. for a further 10 hours.

Mixture B: TEA/styrene/NaH
4182 g of ethylbenzene were used as initial charge in a 15 l stirred tank at 25° C., and were mixed, with stirring, with y1 g of styrene and y2 g of the 60% strength by weight solution of NaH in mineral oil. 10 min after this, 380 g of the 20% strength by weight solution of TEA in ethylbenzene were added to the mixture, and the solution was cooled to 50° C. The mixture was kept at this temperature for 3 hours.

Tables 1 and 2 give the individual values for variables y1 to y3.

2. Preparation of Polybutadiene Rubbers R1c to K7
411 kg of ethylbenzene were used as initial charge, with stirring, in a stirred tank of capacity 1500 l, and x1 kg of styrene were added. The temperature of the mixture was controlled to 50° C., and at this temperature x2 g of the 12% strength by weight solution of s-BuLi in cyclohexane were added. 10 min after this, the temperature of the mixture was controlled to 60° C., and x3 g of THF and x4 kg of butadiene were added. After 20 min, the mixture was cooled to 60° C., and x5 kg of butadiene were added. After a further 25 min, the mixture was again cooled to 60° C., and x6 kg of butadiene were added to the mixture. The method of addition of the further butadiene portions x7, x8, and x9 was the same as that for portion x6. x10 min after addition of the final portion x9, x11 kg of styrene were added as final monomer portion to the mixture. After a further 30 min, the mixture was cooled to 80° C., and x12 g of the mixture B were added to the mixture. Each of the abovementioned cooling processes used evaporative cooling.

The solids content (SC) of the resultant rubber solution was x13% by weight. It was diluted by adding x14 kg of styrene. This gave a rubber solution whose solids content was x15% by weight. It was placed into intermediate storage in a buffer tank.

GPC analysis (gel permeation chromatography in tetrahydrofuran, calibration using polybutadiene standards) showed that the polymer had monomodal distribution. The residual butadiene monomer content determined by gas chromatography was below 10 ppm(w). The weight-average molar mass Mw was determined by GPC as described above, and was x16 kg/mol.

Table 1 collates the individual values for variables x1 to x16.

TABLE 1

Rubber preparation: variables y1 to y3 and x1 to x16 (SC meaning solids content)

| | | Example | | | |
|---|---|---|---|---|---|
| | | R1 | R2 | R3 | R4 |
| Mix. B | y1 styrene [g] | 900 | 900 | 900 | 900 |
| | y2 NaH soln. [g] | 26.5 | 26.5 | 26.5 | 26.5 |
| x1 Styrene [kg] | | 22 | 22 | 22 | — |
| x2 s-BuLi soln. [g] | | 636 | 636 | 636 | 920 |
| x3 THF [g] | | — | — | — | — |
| x4 Butadiene [kg] | | 28 | 28 | 28 | 32 |
| x5 Butadiene [kg] | | 22.5 | 22.5 | 22.5 | 27 |
| x6 Butadiene [kg] | | 21 | 21 | 21 | 25 |
| x7 Butadiene [kg] | | 19 | 19 | 19 | 24 |
| x8 Butadiene [kg] | | 17.5 | 17.5 | 17.5 | 21 |
| x9 Butadiene [kg] | | 24 | 24 | 24 | 28 |
| x10 Waiting time [min] | | 10 | 10 | 10 | — |
| x11 Styrene [kg] | | 5.5 | 5.5 | 5.5 | — |
| x12 Mixture B [g] | | 23 000 | 11 000 | 5500 | 5500 |
| x13 SC [% by wt.] | | 28.3 | 28.3 | 28.3 | 28.3 |
| x14 Styrene (dil.) [kg] | | 229 | 229 | — | — |
| x15 SC [% by wt.] | | 20.2 | 20.2 | 28.2 | 28.2 |
| x16 Molar mass[1] [kg/mol] | | 20/121/5 | 19/120/5 | 20/120/6 | —/102/— |

[1]Stated as styrene block/butadiene block/styrene block, — meaning block not present. Accordingly, example R4 is a homopolybutadiene.

1) Stated as styrene block/butadiene block/styrene block,— meaning block not present. Accordingly, example R4 is a homopolybutadiene.

3. Preparation of Impact-Resistant Polystyrenes HIPS1 to HIPS11, Using Stirred-Tank/Tower Reactor HIPS was prepared continuously (matrix polymerization) as described below, and the rubber solution for this was taken continuously from the buffer tank. A jacketed 50 l stirred tank with standard anchor stirrer was used. The reactor was designed for an absolute pressure of 25 bar, and also had temperature control by a heat-transfer medium and by evaporative cooling for isothermal conduction of the reaction.

x17 kg/h of styrene, x18 kg/h of the rubber solution (see item 2 above, and also table 1), and x19 g/h of the mixture A or B (see item 1 above) were metered continuously into the stirred tank, with stirring at 115 rpm, and the tank was kept at a constant reactor-wall temperature of from 130 to 150° C. The solids content at the outlet of the stirred tank was x20% by weight.

The reaction mixture was conveyed (x21) either into a stirred 29 l tower reactor or into a tubular reactor whose length was 7 m and whose diameter was 500 mm, the reactor having two heating zones of equal size, the first zone being kept at 140° C. and the second zone at 180° C. reactor-wall temperature.

The output from the tower reactor was admixed with x22 g/h of water and then with x23 g/h of an additive mixture I, which had been prepared in advance from x24 g of Irganox® 1076 and x25 kg of Winog® 70 mineral oil, and was then passed through a mixer, and finally passed through a tube section heated to 250° C. For devolatilization, the reaction mixture was then conveyed by way of a pressure-control valve into a partial evaporator operated at x26° C., and was depressurized into an evacuated vessel operated at an absolute pressure of 10 mbar and x27° C.

The resultant polymer melt was discharged by a conveying screw and then treated with x28 g/h of an additive mixture II which had been prepared in advance from x29 g of Irganox® 1076 and x30 kg of Winog® 70 mineral oil, and then was passed through a mixer and pelletized. Conversion was quantitative.

The resultant HIPS had the following residual monomer contents, determined as described above: styrene below 5 ppm(w), ethylbenzene below 5 ppm(w).

Table 2 collates the individual values for variables x17 to x30.

TABLE 2

HIPS preparation: variables x17 to x32 (Tb. meaning tube, SC meaning solids content)

| | | Example | | | | | |
|---|---|---|---|---|---|---|---|
| | | H1 | H2 | H3 | H4 | H5 | H6 |
| Mix. A or B | y1 styrene [g] | — | 900 | 900 | 250 | 1100 | 1100 |
| | y2 s-BuLi/NaH soln. [g] | — | 26.5 NaH | 26.5 NaH | 518 s-BuLi | 26.5 NaH | 26.5 NaH |
| x17 Styrene [kg/h] | | 7.4 | 7.4 | 6.6 | 6.6 | 7 | 5.8 |
| x18 Rubber soln. [kg/h] | | 8.7 | 8.7 | 9.4 | 9.4 | 9 | 10.3 |
| | | R1 | R2 | R2 | R2 | R3 | R4 |
| x19 Mix. A or B [g/h] | | — | 120 B | 130 B | 275 A | 180 B | 180 B |
| x20 SC [% by wt.] | | 45 | 47 | 47 | 47 | 47 | 47 |
| x21 Tower or tube | | Tb. | Tb. | Tb. | Tb. | Tb. | Tb. |
| x22 Water [g/h] | | 50 | 50 | 50 | 50 | 50 | 50 |
| x23 Additive mix. I [g/h] | | 320 | — | — | — | — | — |
| x24 Irganox 1076 [g] | | 240 | — | — | — | — | — |
| x25 Mineral oil [kg] | | 5 | — | — | — | — | — |

TABLE 2-continued

HIPS preparation: variables x17 to x32 (Tb. meaning tube, SC meaning solids content)

| | Example | | | | | |
|---|---|---|---|---|---|---|
| | H1 | H2 | H3 | H4 | H5 | H6 |
| x26 Temp. of partial evap. [° C.] | 280 | 280 | 280 | 275 | 285 | 285 |
| x27 Temp. of evac. vessel [° C.] | 280 | 280 | 280 | 275 | 285 | 285 |
| x28 Additive mix. II [g/h] | — | 320 | 270 | 270 | 270 | 270 |
| x29 Irganox 1076 [g] | — | 240 | 240 | 240 | 240 | 240 |
| x30 Mineral oil [kg] | — | 5 | 5 | 5 | 5 | 5 |

The invention claimed is:

1. A process for preparation of impact-resistant polystyrene from diene monomers and from styrene monomers via anionic polymerization, comprising
in a stage 1) a rubber solution is prepared from the diene monomers, or from the diene monomers and from the styrene monomers, using an alkali metal organyl compound as initiator and with concomitant use of a solvent, and then
2) in a stage 2), styrene monomer is added to the rubber solution, and the resultant mixture is polymerized anionically to give the impact-resistant polystyrene,
and where, after stage 1) and prior to stage 2), an organylaluminum compound and an alkali metal hydride are added to the rubber solution.

2. The process according to claim 1, wherein butadiene is used as diene monomer and styrene is used as styrene monomer.

3. The process according to claim 1, wherein the rubber has been selected from polybutadiene and styrene-butadiene block copolymers.

4. The process according to claim 1, wherein an organyllithium compound is used as alkali metal organyl compound.

5. The process according to claim 1, wherein triethylaluminum (TEA) or triisobutylaluminum (TIBA) or a mixture of these is used as organylaluminum compound.

6. The process according to claim 1, wherein sodium hydride is used as alkali metal hydride.

7. The process according to claim 1, wherein concomitant use is made of tetrahydrofuran during preparation of the rubber solution.

8. The process according to claim 1, wherein, prior to stage 2), the rubber solution is diluted with styrene monomer.

9. The process according to claim 1, wherein the polymerization is carried out in first stage 1) batchwise and in stage 2) continuously.

10. An impact-resistant polystyrene, obtainable by the process according to claim 1.

11. A method for the production of moldings, of foils, of fibers, or of foams comprising utilizing the impact-resistant polystyrene according to claim 10, in the manufacture of moldings, foils, fibers or foams.

12. A molding, a foil, a fiber, or a foam composed of impact-resistant polystyrene according to claim 10.

13. The process according to claim 2, wherein the rubber has been selected from polybutadiene and styrene-butadiene block copolymers.

14. The process according to claim 2, wherein an organyllithium compound is used as alkali metal organyl compound.

15. The process according to claim 3, wherein an organyllithium compound is used as alkali metal organyl compound.

16. The process according to claim 2, wherein triethylaluminum (TEA) or triisobutylaluminum (TIBA) or a mixture of these is used as organylaluminum compound.

17. The process according to claim 3, wherein triethylaluminum (TEA) or triisobutylaluminum (TIBA) or a mixture of these is used as organylaluminum compound.

18. The process according to claim 4, wherein triethylaluminum (TEA) or triisobutylaluminum (TIBA) or a mixture of these is used as organylaluminum compound.

19. The process according to claim 2, wherein sodium hydride is used as alkali metal hydride.

20. The process according to claim 3, wherein sodium hydride is used as alkali metal hydride.

* * * * *